United States Patent [19]

Briggs

[11] 4,366,203

[45] Dec. 28, 1982

[54] FOAMED PLASTICS LAMINATES

[75] Inventor: Peter J. Briggs, Cheshire, England

[73] Assignee: Imperial Chemical Industries Limited, London, England

[21] Appl. No.: 272,467

[22] Filed: Jun. 11, 1981

[30] Foreign Application Priority Data

Jul. 11, 1980 [GB] United Kingdom ............... 8022712

[51] Int. Cl.³ .................... B32B 5/02; B32B 19/04
[52] U.S. Cl. ......................... 428/304.4; 428/318.4;
428/319.1; 428/329; 428/331
[58] Field of Search ............ 428/310, 313, 315, 324,
428/328, 329, 331, 304.4, 318.4, 319.1

[56] References Cited

U.S. PATENT DOCUMENTS

| 4,130,687 | 12/1978 | Ballard et al. | 428/313.7 |
| 4,269,628 | 5/1981 | Ballard et al. | 428/310 |
| 4,271,228 | 6/1981 | Foster et al. | 428/324 |
| 4,292,363 | 9/1981 | Briggs | 428/319.1 |
| 4,292,369 | 9/1981 | Ohashi et al. | 428/319.1 |

Primary Examiner—William J. Van Balen
Attorney, Agent, or Firm—Cushman, Darby & Cushman

[57] ABSTRACT

Laminated foamed plastics articles, especially polyurethane and polyisocyanurate rigid foam panels, are faced with a composite layer of vermiculite lamellae and metal foil, especially aluminum foil. The vermiculite lamellae are preferably size-graded to below 50 microns and form a coating on the metal foil which has a thickness preferably below 50 microns. The laminated articles have good fire resistance properties.

7 Claims, 1 Drawing Figure

FOAMED PLASTICS LAMINATES

This invention relates to laminated articles of improved fire resistance having a core of rigid foamed plastic material.

Rigid foams, because of their unusually good thermal insulation properties, find application in the fabrication of structural components for the building industry. Unfortunately, a failing of most rigid foams is their combustibility which is mainly due to their organic chemical structure. Further, the physical structure of the foam can assist the spread of fire.

Laminated articles having a core of rigid foam can be made continuously or batchwise in a mould or former. The process of continuous lamination usually involves deposition of a foam-forming plastics mixture onto one of two facing sheets and bringing the second sheet into contact with the mixture before it sets and sometimes before it foams. Conveniently, both for cheapness and ease of handling, the facing sheets are often of paper or aluminium foil which can be fed from rolls, These materials have obvious disadvantages, however, in a fire. Paper facing are flammable and aluminium foil can melt and peel.

As building regulations become stricter there is an increasing need for a more fire resistant rigid foamed plastics laminate.

Various ways of improving the fire resistance of these laminates have been tried which include incorporating flame retardant additives in the foam itself and using intumescent layers and incombustible facing materials. Incombustible materials which have been used include asbestos cement board; steel; tempered glass; gypsum board and perlite board. While these materials provide fire resistant facings they lack flexibility and are therefore unsuitable for many applications and present handling problems in the continuous production of laminates.

According to the present invention we provide a laminated article having rigid foamed plastics core covered, at least in part, with a composite layer of vermiculite lamellae and a metal foil. The invention also includes a process for the manufacture of the laminated article.

Rigid foamed plastics materials which may be used in the production of the laminated articles of the invention may be any such materials described in the prior art. Examples of these materials are polyurethane, polyisocyanurate, polyurea, polyolefin, polystyrene, phenol-formaldehyde, epoxy and other polymeric foams.

The term "rigid foam" is commonly used by foam-technologists and its method of manufacture from these various materials well known.

Of special interest to us are laminates made from rigid polyurethane and rigid polyisocyanurate foams, and particularly those made continuously. Generally, these foams will have a density in the range of from 10 to 80 Kg/m$^3$. However, foams having higher densities, for example up to 1000 Kg/m$^3$ may also be protected by vermiculite/metal foil composites: these foams are usually prepared in a press or rigid mould by, for example, reaction injection moulding. If desired, the foams may contain conventional fire-retardant additives for example tris (halogenoalkyl)phosphates, reinforcing fibres (for example glassfibre filaments or strands) and fillers (for example, fly ash, expanded perlite), which may have intumescent materials on their surfaces. Intumescent materials may also be used in the form of sheets and interleaved with the laminates or as part facing for the laminate. Other types of facing material may be used in part.

The term vermiculite is used to describe materials known mineralogically and commercially as vermiculite. By "vermiculite lamellae" we mean particles of delaminated vermiculite that are platelets having a high aspect ratio (length or breadth divided by thickness). They may be obtained by chemically delaminating vermiculite and preferably have a particle size less than 50 microns. Such particles have a thickness of less than 0.5 micron, usually less than 0.05 micron and preferably less than 0.005 micron. Their aspect ratio is at least 100, preferably at least 1000, for example 10,000.

The formation of vermiculite sheets from swollen vermiculite after the vermiculite has been delaminated to reduce the size of the individual particles or lamellae to colloidal dimensions is described in, for example, the specifications of British Pat. Nos. 1016385, 1076786 and 1119305 and in particular in British Pat. No. 593,382.

The process described in these UK patent applications is for the production of shaped articles, including sheets, papers and films, from vermiculite and comprises the steps of:

1. swelling by contacting vermiculite ore with an aqueous solution of at least one salt of sodium, lithium, or an organo substituted ammonium cation, followed by aqueous washing, so that the ore swells to at least twice, preferably four times, its original volume;

2. delamination of the swollen vermiculite by subjecting the particles in the aqueous suspension from step 1 to a shearing action until a suspension of vermiculite particles having dimensions less than 50 $\mu$m may be selected, the suspension producing a flocculated viscosity of at least 100 centipoises;

3. elimination from the suspension of all particles having a diameter larger than 50 $\mu$m, preferably larger than 20 $\mu$m; and 4. formation of shaped articles from the resultant aqueous suspension by removal of water whilst the article is being shaped against a solid surface by deposition of vermiculite particles from the suspension.

The flocculated viscosity is defined as the maximum viscosity which a suspension, after flocculation with dilute hydrochloric acid, and containing not greater than 7% by weight of vermiculite solids, will exhibit at a shear rate of 58 sec$^{-1}$.

The thickness of the vermiculite sheets obtained from this process may be in the range of 0.05 to 0.5 mm.

The present invention is based on the discovery that vermiculite lamellae when applied to metal surfaces in the form of a suspension or slurry and particularly when graded in size by the elimination of larger particles from the slurry, adhere firmly to and give good coverage of the metal surfaces. Debonding on flexing is resisted. Surprisingly, vermiculite seems to be quite specific in these properties amongst the family of layer silicate minerals which are not shared with, for example, talc, mica, kaolinite and montmorillonite.

Metal foils suitable for use in the invention are preferably low melting foils especially foils made of aluminium and its alloys, although other foils, eg. ferrous types, may also be used. The alloying elements that are commonly used with aluminium are copper, magnesium, manganese, silicon, zinc and nickel. Chromium, titanium, cadmium, columbium, cerium, tin, lead, bismuth, beryllium, boron, zirconium and vanadium may also be used in these alloy foils.

By low melting foils, we mean foils which melt at or below the temperature generated in a fire in a building which may be 800° to 900° C. Thus foils which melt below 1000° C. are included.

The laminates of the invention have significant advantages in a fire when they are used to line the walls or ceilings of a building. Most aluminium alloy foils, for example melt in a high temperature fire when the surface temperature exceeds 650° C., so that facings made with these foils will be inadequate in protecting the foam core of the laminate. Aluminium foils coated with vermiculite lamellae provide a fire barrier for the foam even though the surface aluminium foil may melt locally in the high temperature flame.

Iron foil becomes very brittle in a high temperature flame so that its use as a facing on its own is limited. Coated with vermiculite and especially a layer of fibre reinforced vermiculite, as hereinafter described, its value as a fire barrier is enhanced.

the vermiculite layer may be reinforced with fibrous material, which resists the development of cracks in the composite and also improves its stiffness. Wrinkles are reduced during processing.

Fibrous material which may be used to reinforce the vermiculite layer includes inorganic fibres and organic fibres, both natural and synthetic. They may be short or long filaments, strands or yarns in random chopped, woven flocked, matted or meshed form.

As examples of inorganic fibres which may be used we mention glass fibres including fibres made from calcium alumina borosilicate glass (E-glass), other glasses such as those known in the trade as A- and C-glasses and specialist glasses such as R- and S-glasses, alumina and zirconia fibres, rock fibre and asbestos.

As examples of natural organic fibres we mention cellulosic fibres such as cotton, linen, jute and flax and hemp, kapok, sisal and lignocellulosic fibres as well as regenerated cellulose fibres including cellulose acetate and viscose rayons.

As examples of synthetic organic fibres we mention polyester, polyamide, polyacrylonitrile, polyvinyl alcohol, 'Aramid' aromatic polyamide, polypropylene, high density polyethylene, polyvinyl chloride and carbon fibres.

Of especial interest to us are glass fibres. These may be used in the form of short or continuous filaments having a diameter of for example 5 to 30 micron; continuous or chopped strands which may be composed of 10–1000 filaments; rovings which comprise several strands twisted, doubled and plied; and matrices of these. The matrices may be composed of, for example, regular woven mats and mats of random filaments, both short and long, random short chopped strands and random continuous strands. They are preferably compact, substantially incompressible mats.

The reinforced layer of vermiculite may also contain other chemicals; eg. lubricants, sizes or binders from fibre-processing and fire-retardants (particularly those which retard surface spread of flame such as halogenated materials, antimony trioxide, alumina trihydrate, borates and phosphates).

The fire resistance of a composite layer of reinforced vermiculite and metal foil is enhanced when the vermiculite lamellae totally encapsulate the exposed surfaces of the fibrous reinforcement and preferably each individual fibre.

A ready formed composite layer of vermiculite lamellae and metal foil is preferably used either for direct application to preformed foam plastics using a suitable adhesive which may be a suspension of vermiculite, or by forming the foam plastics core onto the composite layer or between two such layers, bonding of the plastics material to the layers being achieved by the adhesive nature of the uncured foam. Preferably the vermiculite face of the composite is bonded to the foam core. This gives a more attractive metallic finish to the product and protects the vermiculite layer from damage by, for instance, water. In this case the composite layer may be formed in situ on the foam by, for example, depositing delaminated vermiculite lamellae from an aqueous suspension onto that part of the foam to be covered by the composite layer and contacting the still wet vermiculite layer with metal foil. In the case of the metal foil face being bonded to the foam, a ready made metal foil faced laminate may be coated with a layer of vermiculite lamellae to form a composite layer in situ.

Where a preformed composite layer is used the surfaces of a suitable mould may first be lined with the composite layer and a foam-forming mix of a plastics material then introduced into the mould.

When the laminated article is to be in the form of a panel it may be produced batchwise in a suitably shaped mould as described above or continuously on any laminating machine suitable for the production of foam board. Such machines are well known in the art and comprise conveying means for continuously advancing flexible or rigid sheet material, usually in a horizontal plane; a spray device or other distributor for depositing a foam mix evenly over the surface of the sheet material, even distribution being achieved either by employing a spreader, multiple spray devices or by reciprocating the spray device transversely across the sheet material; and, if desired, means for bringing a second sheet material into contact with the foam before it has set or possibly before or during foaming. When the foam is formed between two facing sheets, the laminate will normally be transported and allowed to foam between two parallel conveyors, the conveyors being either maintained at a set distance apart or designed to exert a predetermined pressure on the foam. The foam mix may even be deposited on the upper of two sheets which is inverted when the foam mix no longer flows under gravity but is still tacky and brought into contact with the lower sheet. Either one or both sheets will be a composite layer of vermiculite lamellae and metal foil. Where only one sheet is such a composite layer, the other sheet may be of any other material which is flexible or rigid and may be of an incombustible material. The foam core may itself contain glass fibre or other reinforcement to improve the stiffness and fire performance of the article.

Rigid facing materials will normally be in the form of discrete sheets which are fed into the laminating machine in abutment. More conveniently, flexible material is used which is in the form of continuous or semicontinuous sheets fed from rolls.

Suitable pre-formed composite layers of vermiculite lamellae and metal foils are prepared by applying an aqueous slurry of delaminated vermiculite, graded to eliminate particles having a diameter in excess of 50 microns, to the metal foil by techniques such as brushing, squeegeeing, knife and roller coating, spraying and dip coating and then drying. Calendering before drying may be desirable to remove any entrained air reducing blistering in a fire and enhancing the appearance of the composite.

Usually the lamellae will be applied from a suspension in a carrier liquid which may be, for example, water or another aqueous medium. Conveniently the suspension obtained from the process of chemical delamination can be used directly. In one such process vermiculite slurry is prepared by stirring vermiculite ore in brine for about half an hour at 80° C. The suspension is centrifuged and wahsed with de-ionised water and the wet cake then stirred with a swelling agent, for example n-butylamine hydrochloride, for another half hour at 80° C. This suspension is similarly centrifuged and washed and the cake slurried in de-ionised water. The slurry is milled and particles having a diameter in excess of 50 micron removed using, for example, a weir-type centrifugal classifier.

Normally slurries of 2 to 40%, more often 10 to 20%, by weight of vermiculite in the slurry are used. For brushing, knife and roller applications slurries of 18 to 20% are conveniently used but more dilute slurries are suitable for spraying applications, e.g. 10–12% by weight of vermiculite, and for dip coating e.g. 4% by weight of vermiculite. Dilution is preferably achieved with deionised water.

The extent to which the fire-performance of the laminated article is upgraded will depend upon the thickness of the coating of vermiculite lamellae applied to the metal foil, being in general higher the thicker the coating. When the coated foil is subjected to a flame or to high temperature conditions, the vermiculite coating, being a poor thermal conductor, tends to maintain the foil at a lower temperature than the applied conditions, and clearly the thicker the coating the greater will be the degree of thermal insulation afforded by the coating. However a valuable feature of the invention is the need for only very thin coatings, for example coatings of thickness below 50 microns, e.g. 5 to 10 microns or less, and it is in respect of such coatings that the valuable property of the coating in upgrading the fire-performance of the foil even when the foil is damaged or destroyed by the flames is most apparent. The weight of vermiculite lamellae applied to the foil to achieve the desired thickness of coating is usefully in the range of 1 to 200 g/m$^2$, preferably 5 to 100 g/m$^2$.

The vermiculite layer may be reinforced with fibres in various ways. For example, fibres may be pressed into the vermiculite slurry which has already been applied to the metal foil; fibres may be bonded first to the foil with, for example, low density polyethylene and the vermiculite applied to the fibrous layer; or a preformed fibrous composite layer of vermiculite and fibres may be bonded to the foil with vermiculite slurry or any other suitable adhesive, preferably a silicate bonding solution. Aluminium foil bonded with low density polyethylene to glassfibre tissue mat is commercially available and convenient to use. Vermiculite slurry can be applied to the tissue facing in much the same way as has already been described for its application direct to metal foil. Preferably sufficient slurry should be applied to ensure fibrous mat or woven material is fully impregnated so that the fibre surfaces are totally encapsulated with vermiculite lamellae. A preformed fibrous composite layer of fibres and vermiculite lamellae may be prepared by a similar application of vermiculite slurry to a fibrous layer.

Normally, the vermiculite/metal foil composites will be flexible and conveniently rolled for storage and handling. It is therefore a particular advantage of the present invention that a lightweight, fire-resistant foam laminate can be produced using facing sheets which can be fed from rolls in the same way as paper. It is a further advantage that where the laminated article is made in a mould having a curved or other shaped surface the composite can often take up the shape of the mould as the foam expands.

The invention is illustrated but not limited by the following examples in which parts and percentages are by weight.

BRIEF DESCRIPTION OF THE DRAWING

The FIGURE of the drawing illustrates schematically the fine test utilized for evaluating samples of laminate.

EXAMPLE 1

Figure 1:
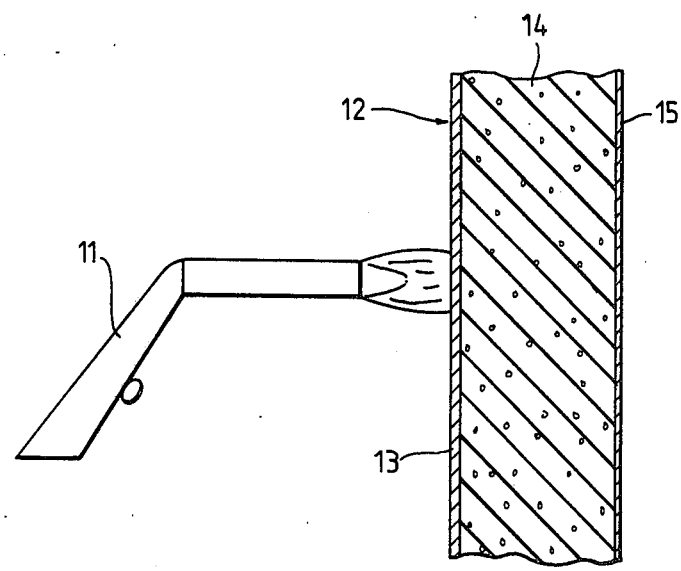

Preparation of Vermiculite Slurry 150 parts of vermiculite ore (Mandoval micron grade ex-South Africa) are agitated with saturated sodium chloride solution in 1:2 ratio in a tank for 30 minutes at 80° C. This suspension is then centrifuged and washed with deionised water. The wet cake is transferred to a second tank where the vermiculite is stirred with 1.5 N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling the slurry is approximately 20% solids and the particles random sized in the range 300–400 micron. This slurry is then passed through a stone-type mill which reduces approximately 50% particles to less than 50 micron. This milled slurry is classified in a weir-type centrifugal classifier and the lighter particles with sieve size less than 50 micron collected for use. Analysis of this 18–21% solids slurry by photosedimentometer and disc centrifuge reveals approximately 40% particles having a size ("equivalent spherical diameter") of 0.4–1.0 micron.

Production of Plastics Foam Laminate

Polyiscocyanurate rigid foam laminate (30 mm thick) was produced on a horizontal laminator made by Viking Engineering Co. Ltd., Stockport, Cheshire and described in an article entitled "A New Development Machine for the continuous lamination of rigid urethane foam" published in "Rubber and Plastics Age", Vol. 47 (1966) No. 1, page 57. The foam-forming ingredients, Part A and Part B, formulated as described below, were separately fed to a high pressure impingment mixing-gun fitted with a spray-type nozzle and mounted on a traversing device and dispensed in turns onto different laydown facing sheets (A, B and C, described below)

|  | Parts by weight |
|---|---|
| Part A | |
| An activator whose composition is described below | 36.2 |
| A catalyst composed of ethylene glycol (20 p.b.w.) potassium acetate (20 p.b.w.) and water (1.5 p.b.w.) | 0.4 |
| "Arcton" 11 | 20 |
| Part B | |
| Polymeric MDI (isocyanate strength about 90%) | 100 |

The activator was composed of the following ingredients:

-continued

| | Parts by weight |
|---|---|
| Polyester from adipic acid, phthalic anhydride, propylene glycol, glycerol (OHV = 250) | 11.4 |
| A 50:50 mixture of oxypropylated tolylene diamine (OHV = 480) and oxypropylated triethanolamine (OHV 525) | 9.0 |
| An ethylene oxide/propylene oxide adduct | 2.0 |
| Cirrasol EN = MP (ethylene oxide-oleyl cetyl alcohol adduct) | 2.0 |
| Trichloropropyl phosphate | 10.0 |
| Silicone L5340 | 0.8 |
| A catalyst composed of ethylene glycol (20 p.b.w.), potassium acetate (20 p.b.w.) and water (1.5 p.b.w.) | 1.0 |

Kraft paper was used as the upper contact facing. The density of the foam in the core of the laminate was 35 kg/m³.

The laydown facing sheets used were made of:
(A) Bright aluminium foil, 25 micron thick;
(B) Bright aluminium foil (9 micron thick) bonded with low density polyethylene (30 g/m²) to wet process urea-formaldehyde bonded glassfibre tissue mat (45 g/m²); and
(C) Bright aluminium foil (9 micron thick) bonded with low density polyethylene (30 g/m²) to wet process urea-formaldehyde bonded glassfibre tissue mat (45 g/m²) impregnated with 53 g/m² of an 18% w/w classified vermiculite slurry (prepared as described above).

Samples of laminates (180×180 mm²) were subjected to a fire test, similar to the American Bureau of Mines Fires Endurance Test (4) 1966, in which, referring to FIG. 1, a propane torch 11 with flame temperature of 1180° C. impinges on the aluminium face 13 of a laminate 12. Kraft paper 15 faces the other side of foam core 14. The duration of the test was varied as indicated in Table 1 below.

In all samples of the laminates A, B and C, the aluminium foil melted and peeled back away from the propane flame over an area of 30 to 50 cm². In the samples of laminates A and B, the foam was exposed to the flame in less than 5 seconds resulting in localized burning and char formation. The glassfibre tissue mat in the sample of laminate B also melted within 5 seconds and offered little protection to the foam. Prolonged exposure to the propane torch resulted in increasing char formation together with erosion of the char at the point of impact of the propane flame. Stresses within the char also resulted in cracks and fissures within the area exposed by the peeled back aluminium foil.

When the sample of laminate C was tested, a barrier to the propane flame was formed by the glassfibre reinforced vermiculite layer. Minor fissures were formed within this layer near the impingement point of the flame and the off-gasses from the foam burnt through these fissures. This glassfibre/vermiculite layer retained its structural integrity throughout the tests and prevented erosion of the foam char behind the facing. This barrier layer significantly reduced fissure formation in the char and considerably extended the burn through time for the laminate from 30½ minutes (laminate B sample) to more than 75 minutes (laminate C sample). Measurements of the char formed in tests on laminates B and C samples are tabulated below:

TABLE 1

| (1) Laminate B Sample | | | | | |
|---|---|---|---|---|---|
| Impingement Time of Flame | Mins | 0.5 | 1 | 3 | 10 |
| Depth of Char (max) | mm | 8 | 18 | 23 | 28 |
| Depth of Cracks | mm | 0 | 4 | 9 | 15 |
| Width of Cracks | mm | 0 | 0.5-3 | 0.5-6 | 2-15 |
| (2) Laminate C | | | | | |
| Impingement Time of Flame | Mins | 0.5 | 1 | 3 | 10 |
| Depth of Char (max.) | mm | 6 | 12 | 18 | 18 |
| Depth of Cracks | mm | 0 | 0 | 0 | 0 |
| Width of Cracks | mm | 0 | 0 | 0 | 0 |

EXAMPLE 2

Bright aluminum foil (25 micron thick) was coated with 18% by weight of (i) milled but non-classified vermiculite slurry (prepared as previously described) and (ii) classified vermiculite slurry. The dry coating weights were 100 g/m² and 75 g/m² respectively. Similar foil was coated with a 50% aqueous slurry of Kaolinite ("Supreme" grade supplied by English China Clays Co Ltd. St. Austell, Cornwall: 94% (min) of the kaolinite particles in this product are less than 2 μm and approx. 60% are finer than 0.5 μm). Dry coating weights of 70 to 120 g/m² kaolinite were applied.

| Coating | Bond Strength* to Aluminum Foil |
|---|---|
| (i) Non-classified Vermiculite | 17.4 (g/cm) |
| (ii) Classified Vermiculite | 26 |
| (iii) Kaolinite | 0 (no measurable strength owing to dusty nature of coating) |

*This was a 180° 'peel test' using adhesive tape to pull away the coating.

This Example shows the superior bond strength of classified vermiculite slurry over milled, non-classified slurry and the superior bond strength of both over Kaolinite. Similar behaviour to that of Kaolinite occurs with micron and talc and confirms the specific characteristic of vermiculite to have self-adhesive properties when coated onto metals.

EXAMPLE 3

Polyisocyanurate foam panels (size 25×25×4.5 cm) were prepared in a press by batch-mixing the following foam composition and casting the reacting mixture onto the facing materials detailed in Table 2.

| Foam Composition | parts by weight |
|---|---|
| Part A | |
| An activator whose composition is described in Example 1 | 36.2 |
| ARCTON 11 | |
| Part B | |
| Polymeric MDI (isocyanate strength about 90%) | 100 |

The reaction mixture had a cream time of 18 seconds and end of rise time of 90 seconds. The density of the foam panels on removal from the press was 46.8 g/m³.

TABLE 2

| Facing | Composition | Total Weight (g/m²) | Coating Weight (g/m²) |
|---|---|---|---|
| A** | Aluminum Foil (25 μm) | 68 | — |

TABLE 2-continued

| Facing | Composition | Total Weight (g/m²) | Coating Weight (g/m²) |
|---|---|---|---|
| B | Aluminum Foil (25 μm) coated with Classified Vermiculite (18% w/w solids) prepared as described in Example 1 | 103 | 35 |
| C** | Aluminum Foil (25 μm) coated with Kaolinite ("Supreme" grade*; 50% w/w solids) | 88 | 20 |
| D** | A laminate of Aluminum Foil (9 μm), Low density Polyethylene (30 g/m²) and Glass fibre Wet Process Tissue (45/m²) | 107 | — |
| E | A laminate of Aluminum Foil (9 μm), Low density Polyethylene (30 g/m²) and Glass fibre Wet Process Tissue (45 g/m²) coated with Classified Vermiculite (18% w/w solids) prepared as described in Example 1 | 208 | 101 |

*Supplied by English China Clays Ltd., St. Austell, England.
**These facings are not composite layers which form part of our invention, but are included for comparative purposes only.

The foam panels were cured for 24 hours at ambient temperature and then subjected to a propane torch test (as described in Example 1) for 10 minutes. In all cases, the aluminium foil layer was pierced by the flame within 5 seconds and with panel A, naked foam was then exposed to the flame. The glassfibre layer of panel D also rapidly melted away from the flame exposing the foam. In panel C, some protection to the foam was offered by the Kaolinite layer but this was so weak that it was soon blown aside by the flame and the process of foam burning with gradual char erosion and cracking began within 2 minutes. The foam core was only protected in panels B and E where the vermiculite layer remained structurally integral in the propane torch and prevented the char cracking and erosion processes. Minor fissures were formed in the vermiculite layer at the site of impingement of the propane torch and these allowed the offgases from the foam to be vented. At the end of the test, there were no other fissures or cracks in the vermiculite/glass fibre layer of panel E, which had been efficiently protected in this high temperature flame and showed little evidence of scorching at the rear of the panel. Measurements on the panels subjected to this severe fire test are tabulated below:

| Panel | Depth of flame-eroded char-hole (mm) | Depth of Cracks (mm) | Width of Cracks (mm) | Comments |
|---|---|---|---|---|
| A | 16 | 6 | 2–4 | Scorching at rear of sample |
| B | 0 | 0 | 0 | Only minor scorching at rear of sample. No fissures in char. |
| C | 16 | 7 | 5–10 | Bad scorching at rear of sample. Little strength in Kaolinite layer. |
| D | 13 | 7 | 2–7 | Two major cracks near flame site. Scorching at back. |
| E | 0 | 0 | 0 | No fissures in char. Little scorching at back. |

Note:
Panel C is included for comparison to indicate superiority of vermiculite over another, low size particle layer silicate.

I claim:
1. A laminated article having a rigid foam plastics core covered, at least in part, with a composite layer of vermiculite lamellae and a metal foil.

2. An article according to claim 1 in which the plastics core is made of rigid polyurethane or polyisocyanurate foam.

3. An article according to claim 1 in which the vermiculite lamellae have a particle size of less than 50 microns.

4. An article according to claim 1 in which the metal foil is aluminium foil.

5. An article according to claim 1 in which the composite layer comprises a metal foil coated with a continuous layer of vermiculite lamellae and is bonded to the foam core such that the layer of vermiculite lamellae is sandwiched between the metal foil and the foam core.

6. An article according to claim 5 in which the layer of vermiculite lamellae has a thickness of less than 50 microns.

7. A process for the manufacture of laminated article having a rigid foam core which comprises covering the core, at least in part, with a composite layer of vermiculite lamellae and a metal foil.

* * * * *